US006282072B1

(12) United States Patent
Minervini et al.

(10) Patent No.: US 6,282,072 B1
(45) Date of Patent: Aug. 28, 2001

(54) ELECTRICAL DEVICES HAVING A POLYMER PTC ARRAY

(75) Inventors: Anthony D. Minervini, Orland Park; Thinh K. Nguyen, Chicago, both of IL (US)

(73) Assignee: Littelfuse, Inc., Des Plaines, IL (US)

( * ) Notice: Subject to any disclaimer, the term of this patent is extended or adjusted under 35 U.S.C. 154(b) by 0 days.

(21) Appl. No.: 09/256,605

(22) Filed: Feb. 23, 1999

Related U.S. Application Data

(60) Provisional application No. 60/075,690, filed on Feb. 24, 1998.

(51) Int. Cl.$^7$ .................................................... H02H 5/00

(52) U.S. Cl. ......................... 361/103; 361/93.1; 361/106; 361/115

(58) Field of Search .................................... 361/103, 104, 361/106, 93.1, 58, 115

(56) References Cited

U.S. PATENT DOCUMENTS

| | | |
|---|---|---|
| 2,978,665 | 4/1961 | Vernet et al. . |
| 3,241,026 | 3/1966 | Andrich . |
| 3,243,753 | 3/1966 | Kohler . |
| 3,351,882 | 11/1967 | Kohler et al. . |
| 3,591,526 | 7/1971 | Kawashima et al. . |
| 3,823,217 | 7/1974 | Kampe . |

(List continued on next page.)

FOREIGN PATENT DOCUMENTS

| | | |
|---|---|---|
| 1254323 | 5/1989 | (CA) . |
| 1253332 | 4/1965 | (DE) . |
| 0 169 059 A2 | 1/1986 | (EP) . |
| 0 229 286 | 7/1987 | (EP) . |
| 0 460 790 A1 | 12/1991 | (EP) . |
| 0 588 136 A2 | 3/1994 | (EP) . |
| 0 731 475 A2 | 9/1996 | (EP) . |
| 0 790 625 A2 | 8/1997 | (EP) . |
| 0 827 160 A1 | 3/1998 | (EP) . |
| 0 901 133 A2 | 3/1999 | (EP) . |
| 541222 | 11/1941 | (GB) . |
| 604695 | 7/1948 | (GB) . |
| 1172718 | 12/1969 | (GB) . |
| 1449261 | 9/1976 | (GB) . |
| 1604735 | 12/1981 | (GB) . |
| 50-33707 | 12/1972 | (JP) . |
| 52-62680 | 5/1977 | (JP) . |
| 53-104339 | 8/1978 | (JP) . |
| 58-81264 | 5/1983 | (JP) . |
| 58-81265 | 5/1983 | (JP) . |
| 58-162877 | 9/1983 | (JP) . |
| 58-162878 | 9/1983 | (JP) . |
| 60-196901 | 10/1985 | (JP) . |
| 62-79418 | 4/1987 | (JP) . |
| 62-79419 | 4/1987 | (JP) . |
| 62-181347 | 8/1987 | (JP) . |

(List continued on next page.)

OTHER PUBLICATIONS

Yoshio Sorimachi, Ichiro Tsubata and Noboru Nishizawa, The Transactions of the Institute of Electronics and Communications Engineers of Japan—Analysis of Static Self Heating Characteristics of PTC Thermistor Based on Carbon Black Graft Polymer, vol. J61–C, No. 12, pp. 767–774 (Dec. 25, 1978).

(List continued on next page.)

*Primary Examiner*—Stephen W. Jackson
(74) *Attorney, Agent, or Firm*—Wallenstein & Wagner

(57) ABSTRACT

The present invention is an electrical circuit protection device having a PTC element with a first common electrode affixed to a first surface of the PTC element and at least two second electrodes affixed to a second surface of the PTC element. The at least two second electrodes are physically separated from one another such that when the at least two second electrodes are connected to a source of electrical current, the current travels from the at least two second electrodes, respectively, through the PTC element, to the first common electrode.

16 Claims, 4 Drawing Sheets

U.S. PATENT DOCUMENTS

| | | | |
|---|---|---|---|
| 3,828,332 | 8/1974 | Rekai . | |
| 3,858,144 | 12/1974 | Bedard et al. . | |
| 4,124,747 | 11/1978 | Murer et al. . | |
| 4,169,816 | 10/1979 | Tsien . | |
| 4,177,376 | 12/1979 | Horsma et al. . | |
| 4,177,446 | 12/1979 | Diaz . | |
| 4,188,276 | 2/1980 | Lyons et al. . | |
| 4,223,209 | 9/1980 | Diaz . | |
| 4,237,441 | 12/1980 | van Konynenburg et al. . | |
| 4,238,812 | 12/1980 | Middleman et al. . | |
| 4,259,657 | 3/1981 | Ishikawa et al. . | |
| 4,272,471 | 6/1981 | Walker . | |
| 4,304,987 | 12/1981 | van Konynenburg . | |
| 4,318,220 | 3/1982 | Diaz . | |
| 4,327,351 | 4/1982 | Walker . | |
| 4,329,726 | 5/1982 | Middleman et al. . | |
| 4,330,703 | 5/1982 | Horsma et al. . | |
| 4,330,704 | 5/1982 | Jensen . | |
| 4,367,168 | 1/1983 | Kelly . | |
| 4,383,942 | 5/1983 | Davenport . | |
| 4,388,607 | 6/1983 | Toy et al. . | |
| 4,413,301 | 11/1983 | Middleman et al. . | |
| 4,426,546 | 1/1984 | Hotta et al. . | |
| 4,426,633 | 1/1984 | Taylor . | |
| 4,445,026 | 4/1984 | Walker . | |
| 4,475,138 | 10/1984 | Middleman et al. . | |
| 4,534,889 | 8/1985 | van Konynenburg et al. . | |
| 4,548,740 | 10/1985 | von Tomkewitsch et al. . | |
| 4,560,498 | 12/1985 | Horsma et al. . | |
| 4,617,609 | 10/1986 | Utner et al. . | |
| 4,685,025 | 8/1987 | Carlomagno . | |
| 4,689,475 | 8/1987 | Kleiner et al. . | |
| 4,700,054 * | 10/1987 | Triplett et al. | 219/545 |
| 4,724,417 | 2/1988 | Au et al. . | |
| 4,732,701 | 3/1988 | Nishii et al. . | |
| 4,749,623 | 6/1988 | Endo et al. . | |
| 4,774,024 | 9/1988 | Deep et al. . | |
| 4,775,778 | 10/1988 | van Konynenburg et al. . | |
| 4,800,253 | 1/1989 | Kleiner et al. . | |
| 4,801,785 | 1/1989 | Chan et al. . | |
| 4,822,983 * | 4/1989 | Bremner et al. | 219/505 |
| 4,857,880 | 8/1989 | Au et al. . | |
| 4,876,439 | 10/1989 | Negahori . | |
| 4,878,038 | 10/1989 | Tsai . | |
| 4,880,577 | 11/1989 | Okita et al. . | |
| 4,882,466 | 11/1989 | Friel . | |
| 4,884,163 | 11/1989 | Deep et al. . | |
| 4,907,340 | 3/1990 | Fang et al. . | |
| 4,910,389 | 3/1990 | Sherman et al. . | |
| 4,924,074 | 5/1990 | Fang et al. . | |
| 4,951,382 | 8/1990 | Jacobs et al. . | |
| 4,955,267 | 9/1990 | Jacobs et al. . | |
| 4,959,632 | 9/1990 | Uchida . | |
| 4,966,729 | 10/1990 | Carmona et al. . | |
| 4,967,176 | 10/1990 | Horsma et al. . | |
| 4,971,726 | 11/1990 | Maeno et al. . | |
| 4,973,934 | 11/1990 | Saito et al. . | |
| 4,980,541 | 12/1990 | Shafe et la. . | |
| 4,983,944 | 1/1991 | Uchida et al. . | |
| 5,068,061 | 11/1991 | Knobel et al. . | |
| 5,089,801 | 2/1992 | Chan et al. . | |
| 5,106,538 | 4/1992 | Barma et al. . | |
| 5,106,540 | 4/1992 | Barma et al. . | |
| 5,136,365 | 8/1992 | Pennisi et al. . | |
| 5,140,297 | 8/1992 | Jacobs et al. . | |
| 5,142,263 | 8/1992 | Childers et al. . | |
| 5,143,649 | 9/1992 | Blackledge et al. . | |
| 5,171,774 | 12/1992 | Ueno et al. . | |
| 5,174,924 | 12/1992 | Yamada et al. . | |
| 5,189,092 | 2/1993 | Koslow . | |
| 5,190,697 | 3/1993 | Ohkita et al. . | |
| 5,195,013 | 3/1993 | Jacobs et al. . | |
| 5,212,466 | 5/1993 | Yamada et al. . | |
| 5,214,091 | 5/1993 | Tanaka et al. . | |
| 5,227,946 | 7/1993 | Jacobs et al. . | |
| 5,231,371 | 7/1993 | Kobayashi . | |
| 5,241,741 | 9/1993 | Sugaya . | |
| 5,247,276 | 9/1993 | Yamazaki . | |
| 5,247,277 | 9/1993 | Fang et al. . | |
| 5,250,226 | 10/1993 | Oswal et al. . | |
| 5,250,228 | 10/1993 | Baigrie et al. . | |
| 5,257,003 | 10/1993 | Mahoney . | |
| 5,268,665 | 12/1993 | Iwao . | |
| 5,280,263 | 1/1994 | Sugaya . | |
| 5,281,845 | 1/1994 | Wang et al. . | |
| 5,289,155 | 2/1994 | Okumura et al. . | |
| 5,303,115 | 4/1994 | Nayar et al. . | |
| 5,313,184 | 5/1994 | Greuter et al. . | |
| 5,337,038 | 8/1994 | Taniguchi et al. . | |
| 5,351,026 | 9/1994 | Kanbara et al. . | |
| 5,351,390 | 10/1994 | Yamada et al. . | |
| 5,358,793 | 10/1994 | Hanada et al. . | |
| 5,374,379 | 12/1994 | Tsubokawa et al. . | |
| 5,382,384 | 1/1995 | Baigrie et al. . | |
| 5,382,938 | 1/1995 | Hansson et al. . | |
| 5,399,295 | 3/1995 | Gamble et al. . | |
| 5,412,865 | 5/1995 | Takaoka et al. . | |
| 5,488,348 | 1/1996 | Asida et al. . | |
| 5,493,266 | 2/1996 | Sasaki et al. . | |
| 5,500,996 | 3/1996 | Fritsch et al. . | |
| 5,543,705 | 8/1996 | Uezono et al. . | |
| 5,554,679 | 9/1996 | Cheng . | |
| 5,610,436 | 3/1997 | Sponaugle et al. . | |
| 5,747,147 | 5/1998 | Wartenberg et al. . | |
| 5,777,541 | 7/1998 | Vekeman . | |
| 5,801,612 | 9/1998 | Chandler et al. . | |
| 5,817,423 | 10/1998 | Kajimaru et al. . | |
| 5,818,676 | 10/1998 | Gronowicz, Jr. . | |
| 5,831,510 | 11/1998 | Zhang et al. . | |
| 5,849,129 | 12/1998 | Hogge et al. . | |
| 5,852,397 | 12/1998 | Chan et al. . | |
| 5,864,281 | 1/1999 | Zhang et al. . | |
| 5,874,885 | 2/1999 | Chandler et al. . | |

FOREIGN PATENT DOCUMENTS

| | | |
|---|---|---|
| 63-85864 | 4/1988 | (JP) . |
| 1-104334 | 4/1989 | (JP) . |
| 2-109226 | 4/1990 | (JP) . |
| 3-221613 | 9/1991 | (JP) . |
| 3-271330 | 12/1991 | (JP) . |
| 5-109502 | 4/1993 | (JP) . |
| 60-298148 | 10/1994 | (JP) . |
| 7-161503 | 6/1995 | (JP) . |
| 9-199302 | 7/1997 | (JP) . |
| WO 93/14511 | 7/1993 | (WO) . |
| WO 94/01876 | 1/1994 | (WO) . |
| WO 95/08176 | 3/1995 | (WO) . |
| WO 95/31816 | 11/1995 | (WO) . |
| WO 95/33276 | 12/1995 | (WO) . |
| WO 95/34084 | 12/1995 | (WO) . |
| WO 98/12715 | 3/1998 | (WO) . |
| WO 98/29879 | 7/1998 | (WO) . |
| WO 98/34084 | 8/1998 | (WO) . |
| WO 99/03113 | 1/1999 | (WO) . |

OTHER PUBLICATIONS

Ichiro Tsubata and Yoshio Sorimachi, Faculty of Engineering, Niigata University—PTC Characteristics and Components on Carbon Black Graft Polymer, pp. 31–38 (with translation).

Yoshio Sorimachi and Ichiro Tsubata, The Transactions of the Institute of Electronics and Communication Engineers of Japan—Characteristics of PTC Thermistor Based on Carbon Black Graft Polymer, vol. J60–C, No. 2, pp. 90–97 (Feb. 25, 1977).

Yoshio Sorimachi and Ichiro Tsubata, Electronics Parts and Materials, Niigata University—The Analysis of Current Falling Characteristics on C.G. (Carbon Black Graft Polymer)—PTC Thermistor, Shingaku Gihou, vol. 9, pp. 23–27 ED–75–35, 75–62 (1975) (with Translation).

B. Wartgotz and W.M. Alvino, Polymer Engineering and Science—Conductive Polyethylene Resins from Ethylene Copolymers and Conductive Carbon Black, pp. 63–70 (Jan., 1967).

Kazuyuki Ohe and Yoshihide Naito, Japanese Journal of Applied Physics—A New Resistor Having an Anomalously Large Positive Temperature Coefficient, vol. 10, No. 1, pp. 99–108 (Jan., 1971).

Ichiro Tsubata and Naomitsu Takashina, 10th Regional Conference on Carbon—Thermistor with Positive Temperature Coefficient Based on Graft Carbon, pp. 235–236 (1971).

J. Meyer, Polymer Engineering and Science—Glass Transition Temperature as a Guide to Selection of Polymers Suitable for PTC Materials, vol. 13, No. 6, pp. 462–468 (Nov., 1973).

J. Meyer, Polymer Engineering and Science—Stability of Polymer Composites as Positive–Temperature–Coefficient Resistors, vol. 14, No. 10, pp. 706–716 (Oct., 1974).

Yoshio Sorimachi and Ichiro Tsubata, Shengakeekai Parts Material—Characteristics of PTC–Thermistor Based on Carbon Black Graft Polymer, vol. 9, Paper, No. UDC 621.316.825.2:8678.744.32–13:661.666.4 (1974).

Carl Klason and Josef Kubat, Journal of Applied Polymer Science—Anomalous Behavior of Electrical Conductivity and Thermal Noise in Carbon Black–Containing Polymers at $T_g$ and $T_m$, vol. 19, pp. 831–845 (1975).

M. Narkis, A. Ram and F. Flashner, Polymer Engineering and Science—Electrical Properties of Carbon Black Filled Polyethylene, vol. 18, No. 8 pp. 649–653 (Jun., 1978).

Andries Voet, Rubber Chemistry and Technology—Temperature Effect of Electrical Resistivity of Carbon Black Filled Polymers, vol. 54, pp. 42–50.

M. Narksi, A. Ram and Z. Stein, Journal of Applied Polymer Science—Effect of Crosslinking on Carbon Black/Polyethylene Switching Materials, vol. 25, pp. 1515–1518 (1980).

Frank A. Doljack, IEEE Transactions on Components Hybrids and Manufacturing—Technology, PolySwitch PTC Devices–A New Low–Resistance Conductive Polymer–Based PTC Device for Overcurrent Protection, vol. CHMT, No. 4, pp. 372–378 (Dec., 1981).

Keizo Miyasaka, et al., Journal of Materials Science—Electrical Conductivity of Carbon–Polymer Composites as Function of Carbon Content, vol. 17, pp. 1610–1616 (1982).

D.M. Bigg, Conductivity in Filled Thermoplastics—An Investigation of the Effect of Carbon Black Structure, Polymer Morphology, and Processing History on the Electrical Conductivity of Carbon–Black–Filled Thermoplastics, pp. 501–516.

J. Yacubowicz and M. Narkis, Polymer Engineering and Science—Dielectric Behavior of Carbon Black Filled Polymer Composites, vol. 26, No. 22, pp. 1568–1573 (Dec. 1986).

Mehrdad Ghofraniha and R. Salovey, Polymer Engineering and Science—Electrical Conductivity of Polymers Containing Carbon Black, vol. 28, No. 1, pp. 5863 (Mid–Jan., 1988).

J. Yacubowicz and M. Narkis, Polymer Engineering and Science—Electrical and Dielectric Properties of Segregated Carbon Black–Polyethylene Systems, vol. 30, No. 8, pp. 459–468 (Apr., 1990).

Biing–Lin Lee, Polymer Engineering and Science—Electrically Conductive Polymer Composites and Blends, vol. 32, No. 1, pp. 36–42 (Mid–Jan., 1992).

H.M. Al–Allak, A.W. Brinkman and J. Woods, Journal of Materials Science—I–V Characteristics of Carbon Black–Loaded Crystalline Polyethylene, vol. 28, pp. 117–120 (1993).

Hao Tang, et al. Journal of Applied Polymer Science—The Positive Temperature Coefficient Phenomenon of Vinyl Polymer/CB composites, vol. 48, pp. 1795–1800 (1993).

V.A. Ettel, P. Kalal, Inco Specialty Powder Products, Advances in Pasted Positive Electrode, (J. Roy Gordon Research Laboratory, Missisauga, Ont.), Presented at NiCad 94, Geneva, Switzerland, Sep. 19–23, 1994.

F. Gubbels, et al., Macromolecules—Design of Electrical Conductive Composites: Key Role of the Morphology on the Electrical Porperties of Carbon Black Filled Polymer Blends, vol. 28 pp. 1559–1566 (1995).

Hao Tang, et al., Journal of Applied Polymer Science—Studies on the Electrical Conductivity of Carbon Black Filled Polymers, vol. 59, pp. 383–387 (1996).

* cited by examiner

ELECTRICAL DEVICES HAVING A POLYMER PTC ARRAY

RELATED APPLICATION

This Application claims the benefit of Provisional Patent Application Ser. No. 60/075,690, filed Feb. 24, 1998.

TECHNICAL FIELD

The present invention is generally directed to an electrical circuit protection device, and particularly, to an apparatus having an array of discrete positive temperature characteristic ("PTC") devices formed on a single continuous sheet of polymer PTC material.

BACKGROUND OF THE INVENTION

It is well known that the resistivity of many conductive materials change with temperature. Resistivity of a PTC conductive material increases as the temperature of the material increases. Many crystalline polymers, made electrically conductive by dispersing conductive fillers therein, exhibit this PTC effect. These polymers include generally polyolefins such as polyethylene, polypropylene and ethylene/propylene copolymers. Typically, polymers exhibiting PTC behavior will have temperature vs. resistivity characteristics such as those graphically illustrated in FIG. 1. At temperatures below a certain value, i.e., the critical or switching temperature, the polymer exhibits a relatively low, constant resistivity. However, as the temperature of the polymer increases beyond the critical temperature, the resistivity of the polymer sharply increases.

Devices exhibiting PTC behavior have been used as overcurrent protection in electrical circuits comprising a power source and additional electrical components in series. Under normal operating conditions in the electrical circuit, the resistance of the load and the PTC device is such that the current flowing through the device and the subsequent $1^2R$ heating of the device is small enough to allow the temperature of the device to remain below the critical or switching temperature. If the load is short circuited or the circuit experiences a power surge, the current flowing through the PTC device increases and its temperature (due to $1^2R$ heating) rises rapidly to its critical temperature. As a result, the resistance of the PTC device greatly increases. At this point, a great deal of power is dissipated in the PTC device. This power dissipation only occurs for a short period of time (a fraction of a second), however, because the power dissipation will raise the temperature of the PTC device to a value where the resistance of the PTC device has become so high, that the original current is limited to a negligible value. This new current value and corresponding high resistance of the PTC material is enough to maintain the PTC device at a new, high temperature / high resistance equilibrium point. The device is said to be in its "tripped" state. This negligible or trickle through current value will not damage the electrical components which are connected in series with the PTC device. Thus, the PTC device acts as a form of a fuse, reducing the current flow through the short circuit load to a safe, low value, when the PTC device is heated to the critical temperature range. Upon interrupting the current in the circuit, or removing the condition responsible for the short circuit (or power surge) the PTC device will cool down below its critical temperature to its normal operating, low resistance state. The effect is a resettable, electrical circuit protection device.

Generally, a separate discrete PTC device is required for providing protection to more than a single electrical circuit.

In products having complex electrical circuitry having a large number of circuits and electrical components, e.g., an automobile or telecommunication equipment, the addition of numerous PTC devices often times consumes a limited amount of space allotted for the electrical circuitry of the product. Further, since each PTC device must be individually manufactured to include discrete elements (e.g., PTC element, terminals) the cost associated with providing electrical circuit protection for a plurality of circuits is increased.

SUMMARY OF THE INVENTION

It is an object of the present invention to provide a single apparatus which can provide overcurrent protection for a plurality of electrical circuits. The apparatus includes an array of discrete PTC devices formed on a single continuous sheet of polymer PTC material.

In a first aspect of the present invention there is provided an overcurrent protection device comprising a PTC element, a first common electrode and second and third electrodes. The PTC element includes a first and a second surface. The first common electrode is connected to the first surface of the PTC element. The second and third electrodes are connected to the second surface of the PTC element and are physically separated from one another so that when the second and third electrodes are connected to a source of electrical current, the current travels from the second and third electrodes, respectively, through the PTC element, to the first common electrode. In a preferred embodiment, a plurality of electrode can be connected to the second surface of the PTC element. As a result the apparatus comprises an array of discrete PTC devices formed on a single, continuous PTC element. The discrete PTC devices utilize the same PTC element and a common first electrode.

In a second aspect of the present invention there is provided an electrical apparatus for providing overcurrent protection to a plurality of electrical circuits. The apparatus is comprised of a single continuous PTC element, an electrically insulating substrate, a common first electrode and a plurality of second electrodes. The electrically insulating substrate is connected to the PTC element. The first common electrode and the plurality of second electrodes each are comprised of a connection portion and a collection portion. The collection portion of the first common electrode is connected to the first surface of the PTC element. The collection portion of the plurality of second electrodes is connected to the second surface of the PTC element. Accordingly, the PTC element is interposed between the collection portion of the electrodes, while the insulating substrate is interposed between the connection portion of the electrodes. This allows one to make a pressure connection to the discrete PTC devices at the connection portion of the electrodes without interfering with the PTC behavior of the device.

For a better understanding of the invention, reference may be had to the following detailed description taken in conjunction with the following drawings. Furthermore, other features and advantages of the invention will be apparent from the following detailed description taken in conjunction with the following drawings.

DETAILED DESCRIPTION OF THE INVENTION

Figure 1:
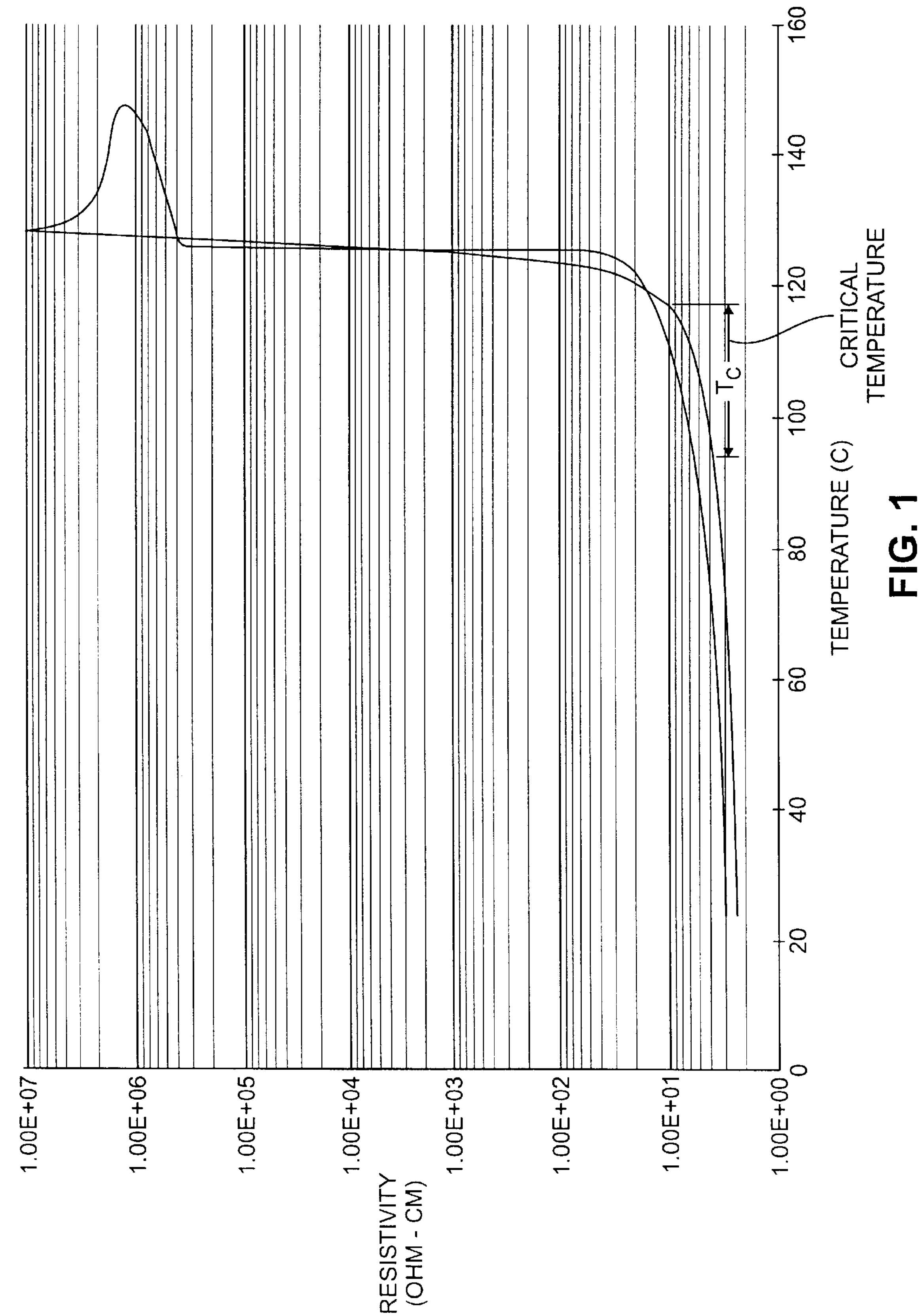
FIG. 1 is a graphical representation of the resistivity versus temperature characteristics of a PTC material.

While this invention is susceptible of embodiments in many different forms, there is shown in the drawings and will herein be described in detail, preferred embodiments of the invention with the understanding that the present disclosure is to be considered as an exemplification of the principles of the invention and is not intended to limit the broad aspects of the invention to the embodiment illustrated.

Figure 2:
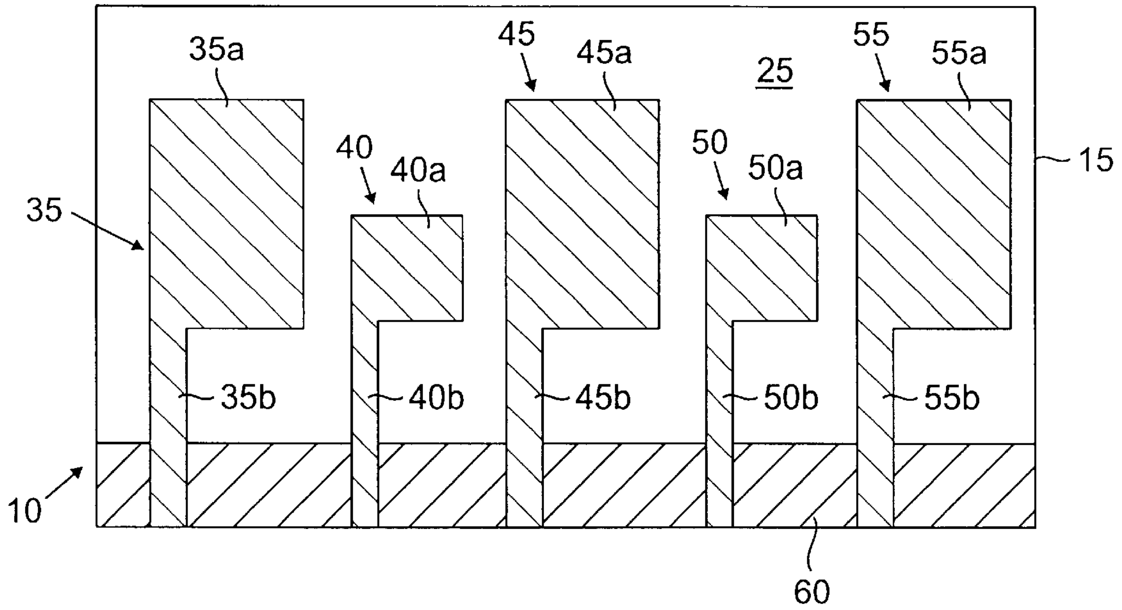
FIG. 2 is a top view of an overcurrent protection device according to one embodiment of the present invention.
Figure 3:
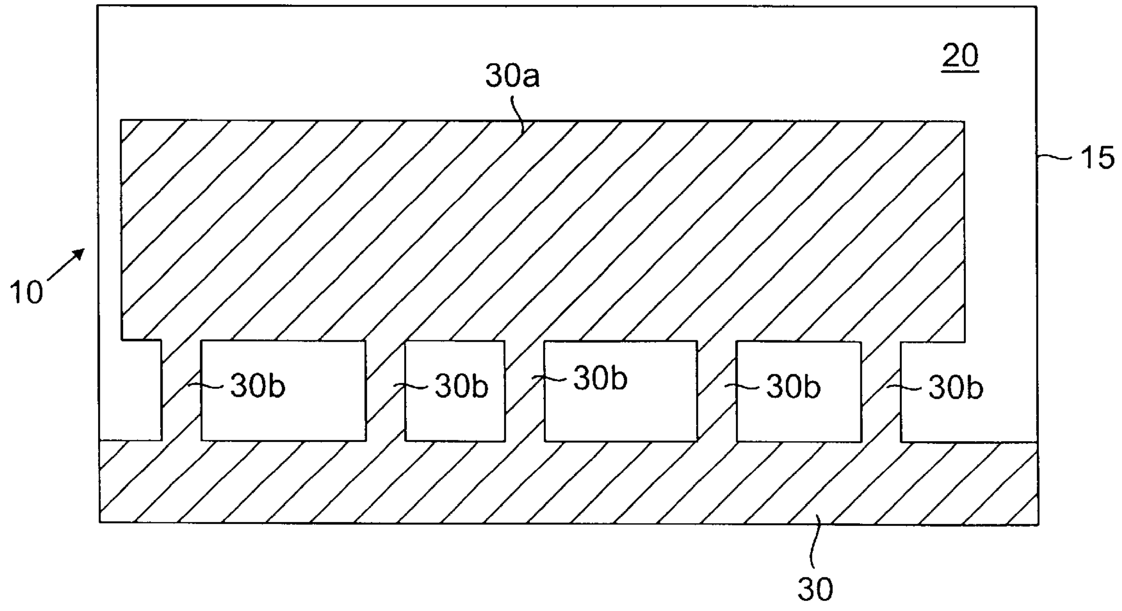
FIG. 3 is bottom view of the overcurrent protection device illustrated in FIG.

Referring to FIGS. 2 and 3, an overcurrent protection device 10 according to the present invention is illustrated. The device 10 is comprised of a PTC element 15 having a first surface 20 and a second surface 25. A first common electrode 30 is affixed to the first surface 20 of the PTC element 15.

At least two second electrodes 35, 40 (or preferably a plurality of second electrodes 45, 50, 55, etc.) are affixed to the second surface 25 of the PTC element 15. The second electrodes 35, 40, 45, 50, 55 are physically separated from one another so that when the second electrodes 35, 40, 45, 50, 55 are connected to a source of electrical current (not shown), the current travels from the second electrodes 35,40, 45, 50, 55, respectively, through the PTC element 15, to the first common electrode 30.

In the preferred embodiment illustrated in FIGS. 2 and 3, the second electrodes 35, 40, 45, 50, 55 each include a corresponding collection portion 35*a*, 40*a*, 45*a*, 50*a*, 55*a* and a corresponding connection portion 35*b*, 40*b*, 45*b*, 50*b*, 55*b*. The first common electrode 30 also has a collection portion 30*a* and a number of connection portions 30*b* which corresponds to the number of second electrodes affixed to the second surface 25 of the PTC element 15. An electrically insulating substrate 60 is connected to the PTC element 15. The substrate 60 adds mechanical strength to the device 10 and allows for pressurized electrical connections to made with the connection portions 30*b*–55*b* of the first common electrode 30 and the plurality of second electrodes 35–55. Thus, preferably the insulating substrate is positioned between the connection portions 30*b*–55*b* of the electrodes 30–55. This arrangement prevents the pressurized electrical connection from restricting or interfering with electrical performance of the PTC element 15, which is allowed to expand freely at its critical temperature.

The PTC element 15 is preferably a polymer material having conductive particles dispersed therein. Examples of suitable PTC compositions for use in the present invention are disclosed in U.S. Pat. Nos. 4,237,441, 4,304,987, 4,545,926, 4,849,133, 4,910,389, 5,174,924, 5,196,145, 5,580,493. These patents are incorporated herein by reference.

The electrodes 30–55 are preferably a metal foil such as an electrode-posited foil having a roughened surface such as disclosed in U.S. Pat. Nos. 4,689,475 and 4,800,253. These patents are incorporated herein by reference.

Preferably, the roughened surface of the metal foil contacts the insulating substrate 60 and the PTC element 15 to promote adhesion between the elements of the device 10. Alternatively, a conductive layer forming the electrodes 30–55 may be deposited directly onto the insulating substrate 60 and the PTC element 15 using conventional deposition processes (e.g., electrodeposition, vapor deposition, sputtering, etc.).

Optionally, in a preferred embodiment (not shown) the device is encapsulated in a protective housing or covered in a protective coating such as epoxy to increase the mechanical stability of the device and protect it from the environment. In this embodiment, the connection portions 30*b*–55*b* extend from the housing or coating so that device 10 may be connected electrically to the circuits to be protected.

Figure 4:
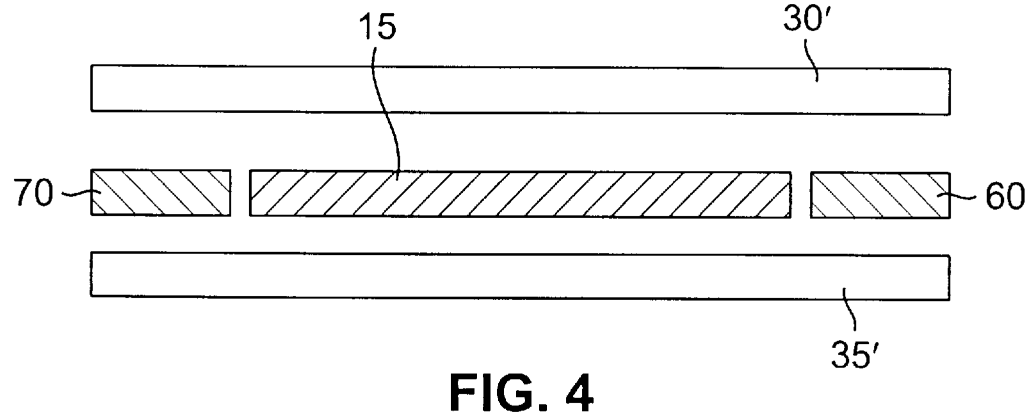
FIG. 4 is an exploded side view of device according to a second embodiment of the present invention prior to lamination.
Figure 5:
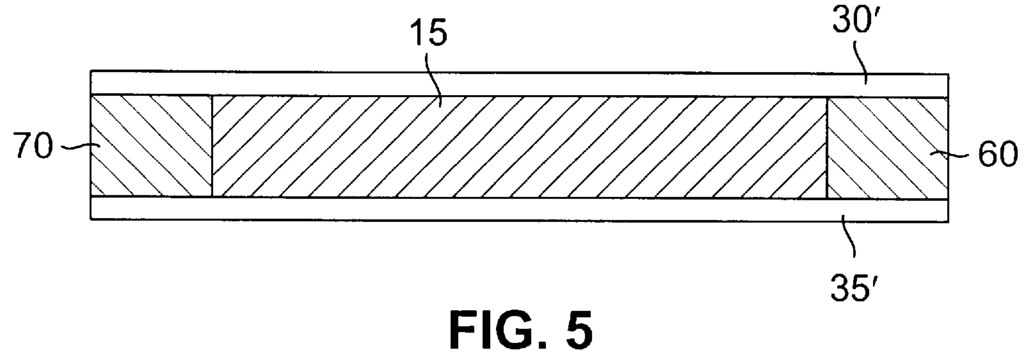
FIG. 5 is a side view of the device illustrated in FIG. 4 subsequent to lamination.

With reference to FIGS. 4–7, the device is preferably in the form of a laminar sheet and includes a second electrically insulating substrate 70. Referring specifically to FIG. 4, the substrates 60,70 and the PTC element 15 is laminated between metal foils 30', 35' by applying heat and pressure. Preferably the thickness of the laminate is less than 0.020 inch, more preferably less than 0.015 inch, and especially less than 0.010 inch. Once the laminate is formed, the plurality of second electrodes 35–55 is formed by masking portions the foil 30' and etching away portions of the exposed foil 30'. Preferably, conventional photolithographic and etching processes can be used to define the desired geometries of the electrodes 30–55.

Figure 6:
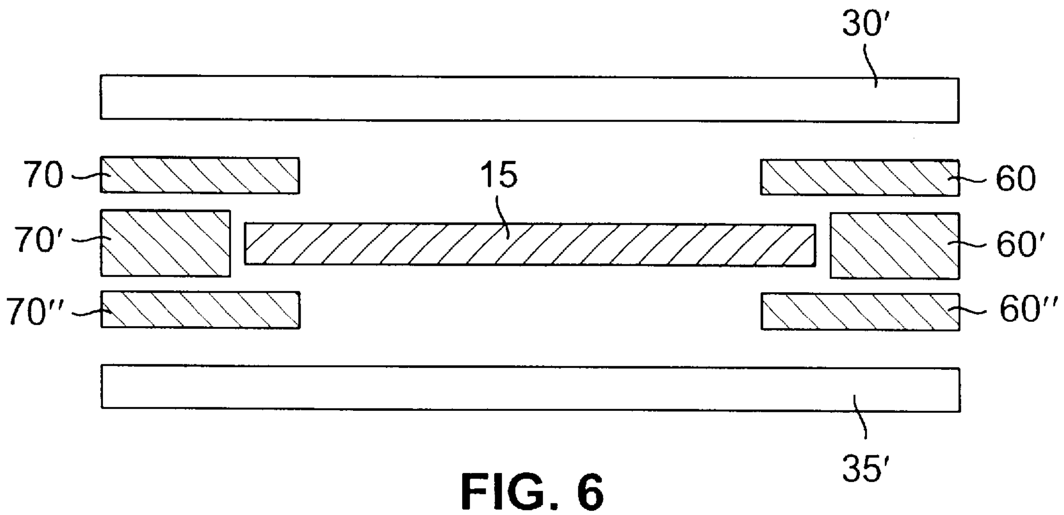
FIG. 6 is an exploded side view of a device according to a third embodiment of the present invention prior to lamination.
Figure 7:
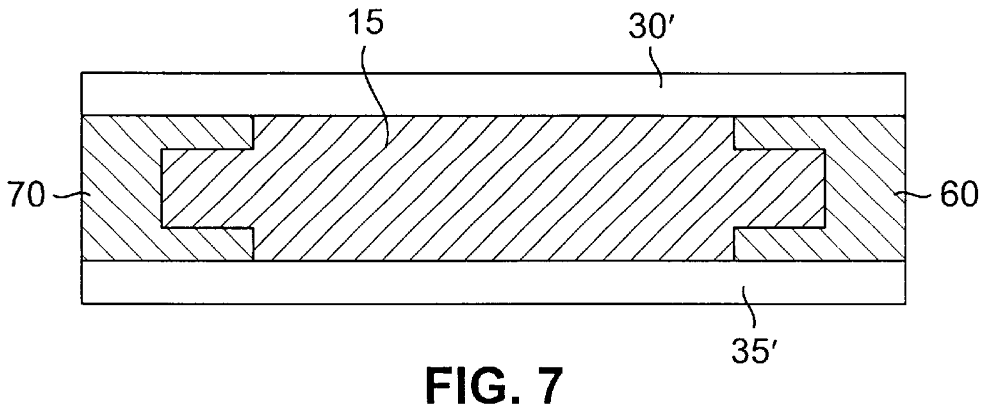
FIG. 7 is a side view of the device illustrated in FIG. 6 subsequent to lamination.

Referring now to FIGS. 6–7, it is preferred that electrically insulating substrates 60,70 form a pocket and surround the edges of the PTC element 15. This arrangement promotes overall adhesion of the device 10 during the lamination process and also helps reduce the chances of short circuits occurring between the foils 30',35'. The protective envelope can be created by using additional insulating substrates 70, 70', 70" and 60, 60', 60". The insulating substrates are preferably formed from an FR-4 epoxy or polyimide resin.

Figure 8:
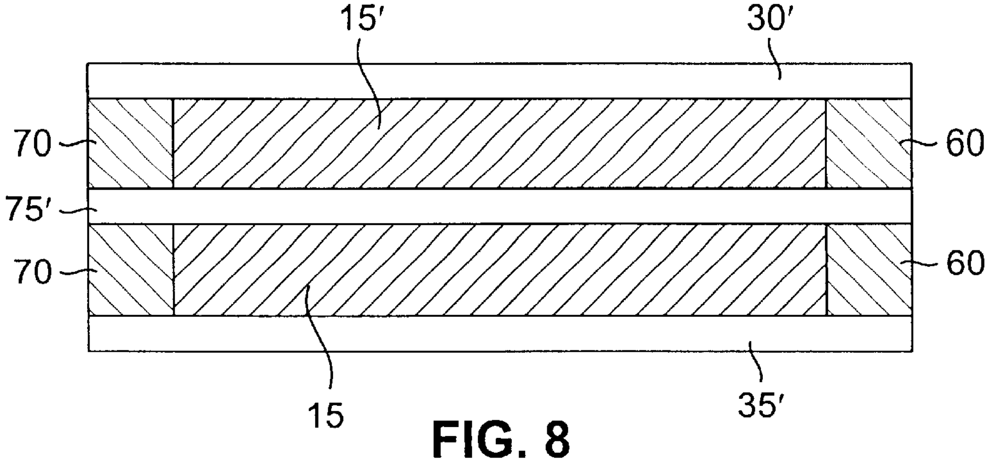
FIG. 8 is a side view of a device according to a fourth embodiment of the present invention.

With reference to FIG. 8, depending upon the required application of the device, multiple layers may be provided. In such embodiment a third metal foil 75'provides an electrical connection between first and second PTC elements 15,15'. As in the embodiments discussed above, after lamination the first common electrode 30 is formed in metal foil 30' and the plurality of second electrodes 35, 40, 45, 50, 55 is formed in metal foil 35' employing conventional photolithographic and etching processes. In this preferred embodiment electrical current flows from the plurality of second electrodes 35, 40, 45, 50, 55 through the first PTC element 15 to the third metal foil 75' common electrode and through the second PTC element 15' to the first common electrode 30.

Figure 9:
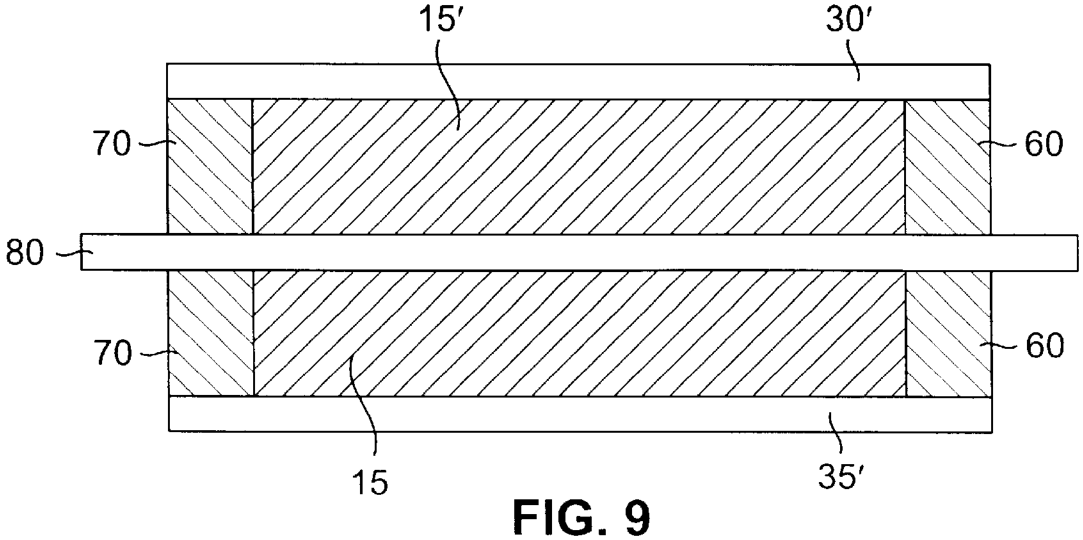
FIG. 9 is a side view of a device according to a fifth embodiment of the present invention.

Referring to FIG. 9, multiple PTC elements 15, 15' are sandwiched between a common ground electrode 80 and first and second metal foils 30', 35', respectively. Following lamination of the device, including attaching electrically insulating substrates 60, 70 to the PTC elements 15, 15', a plurality of electrodes is formed (not shown) using conventional photolithographic and etching processes in the first and second metal foils 30', 35'. The device can provide protection to a plurality of circuits having current flowing from the plurality of electrodes formed in the first foil 30', through PTC element 15', to the common ground electrode 80 and also to a plurality of circuits having current flowing from the plurality of electrodes formed in the second foil 35', rough PTC element 15, to the common ground electrode 80.

We claim:

1. An electrical circuit protection device comprising:

a PTC element having first and second surfaces;

a first common electrode affixed to the first surface of the PTC element;

a second electrode affixed to the second surface of the PTC element;

a third electrode affixed to the second surface of the PTC element and being physically separated from the second electrode so that when the second and third electrodes are connected to a source of electrical current, the current travels from the second and third electrodes, respectively, through the PTC element, to the first common electrode.

2. The circuit protection device of claim 1, further including a plurality of electrodes affixed to the second surface of the PTC element, the plurality of electrodes being physically separated from one another so that when the plurality of electrodes are connected to a source of electrical current, the current travels from the plurality of electrodes, respectively, through the PTC element, to the first common electrode.

3. The circuit protection device of claim 1, wherein the first, second and third electrodes each include a collection portion and a connection portion.

4. The circuit protection device of claim 3, wherein an electrically insulating substrate is connected to the PTC element and is positioned between the connection portions of the first and the second and third electrodes, respectively.

5. The circuit protection device of claim 1, wherein the PTC element is comprised of a conductive polymer.

6. The circuit protection device of claim 1, wherein the first, second and third electrodes are comprised of a metal foil.

7. The circuit protection device of claim 1, wherein the PTC element is encapsulated in a protective housing.

8. An electrical apparatus for providing overcurrent protection to a plurality of electrical circuits, the apparatus comprising:

a single continuous PTC element having a first and a second surface;

a first electrically insulating substrate connected to the PTC element;

a common first electrode having a connection portion and a collection portion, the connection portion being in contact with the insulating substrate and the collection portion being in contact with the first surface of the PTC element; and a plurality of second electrodes having a connection portion and a collection portion, the connection portion of each of the plurality of electrodes being in contact with the insulating substrate and the collection portion of each of the plurality of electrodes being in contact with the second surface of the PTC element.

9. The electrical apparatus of claim 8, wherein the plurality of second electrodes are separated from one another so that when each of the plurality of second electrodes is electrically connected to a corresponding plurality of electrical circuits having electrical current flowing therethrough, the current from each circuit flows through the single continuous PTC element to the first common electrode.

10. The electrical apparatus of claim 8, wherein the apparatus is in the form a laminar sheet.

11. The electrical apparatus of claim 8, further including a second electrically insulating substrate connected to the PTC element.

12. The electrical apparatus of claim 10, wherein the laminar sheet has a thickness of less than 0.020 inch.

13. The electrical apparatus of claim 8, further including a protective coating covering the PTC element.

14. The electrical apparatus of claim 8, wherein the electrically insulating substrate is comprised of epoxy.

15. The electrical apparatus of claim 8, wherein the electrically insulating substrate is comprised of a polyimide resin.

16. An electrical apparatus comprised of:

a first PTC element having a first and a second surface, a first plurality of electrodes affixed to the first surface and a common electrode affixed to the second surface; and a second PTC element having a first and a second surface, a second plurality of electrodes affixed to the first surface of the second PTC element and the common electrode affixed to the second surface of the second PTC element.

* * * * *